United States Patent [19]
Korin et al.

[11] Patent Number: 5,520,813
[45] Date of Patent: May 28, 1996

[54] PROCESSING OF NUCLEAR WASTE SOLUTIONS BY MEMBRANE SEPARATION

[76] Inventors: Amos Korin; Netta Korin, both of 16 Mountain View Dr., Weston, Conn. 06883

[21] Appl. No.: 376,852

[22] Filed: Jan. 23, 1995

[51] Int. Cl.$^6$ .......................... B01D 15/04; B01D 11/04
[52] U.S. Cl. .................. 210/638; 210/644; 210/651; 210/321.75; 210/682; 204/267; 204/524; 204/529; 423/DIG. 14
[58] Field of Search ................... 210/651, 638, 210/641, 644, 257.2, 682, 321.75; 204/1.5, 182.3, 182.4, 267; 423/DIG. 14, 2, 6

[56] References Cited

U.S. PATENT DOCUMENTS

| | | | |
|---|---|---|---|
| 3,647,086 | 3/1992 | Mizutani et al. | 204/182.3 |
| 3,847,772 | 11/1974 | Sata et al. | 204/182.3 |
| 4,306,946 | 12/1981 | Kim | 210/644 |
| 4,312,279 | 1/1982 | Wills | 210/321.75 |
| 4,465,579 | 8/1984 | Mataga et al. | 204/255 |
| 4,764,281 | 8/1988 | Elfline | 210/668 |
| 5,004,538 | 11/1991 | Boeteng | 210/644 |
| 5,078,842 | 1/1992 | Wood et al. | 210/638 |

OTHER PUBLICATIONS

Yukio Mizutani, Ion Exchange Membranes with Preferential Permselectivity for monovalent Ions, Journal of Membrane Science, vol. 54, (1990), pp. 233–257.

Ogumi et al., Modification of Ion–Exchange Membrane Surface by Plasma Process. Part 2. Journal of Membrane Science, vol. 54, (1990), pp. 163–174.

Killer et al., On the Nitrate and Monovalent Cation Selectivity of Ion Exchange Membranes used in Drinking Water Purification, Journal of Membrane Science, 75 (1992), pp. 265–275.

Ohmura et al., Interaction of Cation–Exchange Membrane with Polycation. II. Poly(N–Alkyl–4–Vinylpyridinium Halides, Journal of Applied Polymer Science, vol. 38, pp. 1025–1036 (1989).

Sata et al., Modification of The Transport Properties of Ion Exchange Membranes. XII., Journal of Membrane Science, vol. 45 (1989), pp. 209–224.

Yasuda et al., Enhancement of Monovalent Cation Perm--Selectivity of Nafion by Plasma–Induced Surface Modification, Chemistry Letters, *The Chemical Society of Japan*, pp. 2013–2016, 1992.

Kaibara et al., Multi–Ionic Potential and Membrane Permeability Matrix. III., Bulletin of the Chemical Society of Japan, vol. 62, pp. 2362–2368 (1989).

Sata et al., Modification of Transport Properties of Ion Exchange Membranes, X, Die Angewandte Makromolekulare Chemie, 171 (1989), pp. 101–117 (Nr. 2794).

*Primary Examiner*—Ana Fortuna
*Attorney, Agent, or Firm*—Ohlandt, Greeley, Ruggiero & Perle

[57] ABSTRACT

A process for separating monovalent ions from a sodium-bearing radioactive waste stream which comprises contacting the sodium-bearing radioactive waste stream against at least one ion exchange membrane having permselectivity for monovalent ions wherein the monovalent ions permeate or diffuse across the ion exchange membrane to form a permeate of a monovalent ion-enriched stream and wherein a retentate is formed from the sodium-bearing radioactive waste stream which is substantially depleted of monovalent ions.

25 Claims, 4 Drawing Sheets

PROCESSING OF NUCLEAR WASTE SOLUTIONS BY MEMBRANE SEPARATION

The present invention generally relates to a method for separating monovalent ions such as sodium, potassium, lithium, cesium, etc. from a nuclear waste solution such that the retentate solution having a relatively low concentration of monovalent ions can be calcined for long term nuclear waste storage. In particular, the separation of the; monovalent ions is accomplished by means of contacting the monovalent ion bearing nuclear waste against an ion exchange membrane which has been modified to have preferential permselectivity for monovalent ions under either electrodialysis or diffusion dialysis conditions.

BACKGROUND OF THE INVENTION

Currently, monovalent ion (e.g., sodium, potassium, lithium and cesium ions) bearing radioactive contaminated, liquid waste (i.e., sodium-bearing nuclear waste) is stored in high level, nuclear waste storage tanks. Under the current Resource Conservation and Recovery Act (RCRA) Land Disposal Restriction (LDR) regulations, this sodium-bearing nuclear waste must be processed with the best demonstrated available technology (BDAT) prior to land disposal. In addition, the current storage tanks do not meet new seismic codes and none of these tanks meet RCRA requirements for secondary containment. As a result, federal and state regulatory agencies now require that the sodium-bearing nuclear waste be depleted from the current storage tank farm pillar and panel tanks by the year 2009 and the remainder of the tanks by 2015.

At this time, the most effective method known for processing the sodium-bearing nuclear waste consists of calcining it as a blend with fluorinel waste generated from fuel reprocessing operations. However, with the curtailment of fuel reprocessing operations at nuclear sites throughout the country, fluorinel waste will no longer be generated. Hence, once radioactive fluorinel waste inventories are depleted, an alternative sodium-bearing nuclear waste processing technology will be required for the remaining waste and all future wastes generated from decontamination activities.

Sodium-bearing nuclear waste cannot be calcined by itself due to the low melting points of sodium and potassium salts relative to the regulated waste calcination temperature. Unless sodium and potassium are minor calcine constituents, the respective melting salts will cause particle agglomerations, which can severely hinder bed fluidization and eventual retrieval of the calcine from the storage bins when the calcine is to be immobilized.

Development efforts have shown that sodium can be acceptably calcined when blended with large amounts of non-radioactive aluminum nitrate. Although the sodium-bearing nuclear waste can be processed with a blend of cold aluminum nitrate, the addition of copious amounts of aluminum nitrate is unattractive due to the increased solid radioactive waste volume and therefore increased costs for calcining, interim calcine storage, calcine immobilization, and disposal in a repository.

Therefore, development efforts are needed to qualify cost effective methods for processing sodium-bearing nuclear waste into a final low-volume waste form. Complicating sodium-bearing nuclear waste treatment is the fact that extensive decontamination activities are planned by various waste sites around the country and current decontamination methods involve large quantities of sodium compounds. As such, to justly address sodium-bearing nuclear waste remediation, alternative decontamination technologies are highly desirable.

Any separation process for removing monovalent ions from sodium-bearing nuclear waste should preferably remove approximately 90% or more of the sodium content from the bulk solution. The present inventors have developed a novel low cost membrane process which combines a separation technique with a substantial cost reduction which satisfies the problems identified above regarding the separation of monovalent ions from radioactive nuclear waste containing such ions.

Sodium-bearing nuclear waste which contain acid sodium solutions are generally the result of decontamination activities at nuclear storage facilities. The sodium content of the sodium-bearing nuclear waste requires dilution if the sodium-bearing nuclear waste is to be vitrified or calcined (i.e., immobilized). Current treatment alternatives remove the radionuclides and toxic metals from the bulk of the waste requiring high level waste disposition. However, these metals provide for good glass formulations; on the other hand, alkali-metals (e.g., sodium, potassium, lithium, cesium, etc.) inhibit such glass formulation. Instead of radionuclide removal, the present inventor's have developed a separation process utilizing membrane electrodialysis and/or diffusion dialysis which subsequently isolate cesium from the alkali-metals using resins. Moreover, if economic incentives exist for commercial use of cesium, then it could be recovered. Otherwise, the cesium impregnated resin can be used as a necessary additive in the glass formulation.

The novel separation process according to the present invention will substantially impact the economic feasibility of radioactive waste disposal by providing a treatment process that will significantly improve the economics and reduce the cost and the volume of immobilization of the liquid nuclear waste which has had its sodium ion content reduced by approximately 90% or more. Implementation of this treatment process will facilitate an efficient environmentally safe solution to the problem of currently stored liquid nuclear waste.

Moreover, this membrane treatment system is capable of separating species into concentrated product streams, withstanding a radiolytic environment, scaling up to processing rates of 2 to 300 gallons (7.57 to 1135.62 liters) per minute, and simple to construct and operate.

The present invention also provides many additional advantages which shall become apparent as described below.

SUMMARY OF THE INVENTION

A process for separating monovalent ions from a sodium-bearing radioactive waste stream which comprises contacting the sodium-bearing radioactive waste stream against at least one ion exchange membrane having permselectivity for monovalent ions wherein the monovalent ions diffuse or permeate across the ion exchange membrane to form a permeate of a monovalent ion-enriched stream and wherein a retentate is formed from the sodium-bearing radioactive waste stream which is substantially depleted of monovalent ions.

The monovalent ions are at least one ion selected from the group consisting of: sodium, potassium, lithium, cesium, rubidium and francium. The resultant permeate comprises about 30–99%, more preferably 50–90%, of the sodium disposed in the sodium-bearing radioactive waste stream.

The ion exchange membranes having permselectivity for monovalent ions is an ion exchange cationic membrane having a cationic polyelectrolyte layer formed thereon. The ion exchange cationic membrane comprises a polymeric backbone which can be formed from copolymers of styrene and vinyl benzene or fluorine polymers. The fluorine polymers are selected from the group consisting of: polymers or copolymers, such as tetrafluoroethylene, vinylidenefluoride and vinylfluoride. The cationic polyelectrolyte layer comprises cationic groups such as pydridinium or ammonium. The cationic polyelectrolyte layer is formed on the surface of the ion exchange cationic membrane by means of coating or plasma deposition such that a chemical bond is formed between the ion exchange cationic membrane surface and the cationic polyelectrolyte layer.

The present invention also involves a method for separating monovalent ions from a sodium-bearing radioactive waste stream which comprises: passing the sodium-bearing radioactive waste stream through at least one electrodialysis assembly which comprises an anode, a cathode, a means for supplying power to the anode and cathode, at least one ion exchange cationic membrane having permselectivity for monovalent ions, at least one ion exchange anionic membrane, a permeate chamber and a feed/retentate chamber alternatingly formed between adjacent pairs of the ion exchange cationic and anionic membranes, the sodium-bearing radioactive waste stream enters the electrodialysis assembly via the feed/retentate chamber; and applying an electrical potential across the anode and cathode which causes the monovalent cations to permeate or diffuse across the ion exchange cationic membrane into the permeate chamber and the anions to o permeate or diffuse across the ion exchange anionic membrane into the permeate chamber, thereby forming a monovalent ion-enriched stream in the permeate chamber and a monovalent ion-depleted nuclear waste stream in the feed/retentate chamber. The process further comprising the steps of: separating solids from the sodium-bearing nuclear waste stream prior to feeding the sodium-bearing nuclear waste stream to the electrodialysis assembly; withdrawing the monovalent ion-enriched stream from the permeate chamber; and withdrawing the monovalent ion-depleted nuclear waste stream from the feed/retentate chamber. Preferably, a carrier fluid (i.e., water or an electrolyte solution) is admixed with the monovalent cations and anions which permeate or diffuse into the permeate chamber to form the monovalent ion-enriched stream. This process also comprising the step of vinylfluoride or calcifying the monovalent ion-depleted nuclear waste stream. Optionally, the monovalent ion-depleted nuclear waste stream is recycled to the electrodialysis assembly for additional separation of the monovalent ions therefrom.

Additionally, the present invention includes a method for separating monovalent ions from a sodium-bearing radioactive waste stream which comprises: passing the sodium-bearing radioactive waste stream through at least one diffusion dialysis assembly which comprises at least one ion exchange cationic membrane having permselectivity for monovalent ions, a permeate chamber and a feed/retentate chamber, the permeate chamber and feed/retentate chamber being formed on opposite sides of the ion exchange cationic membrane, the sodium-bearing radioactive waste stream enters the diffusion dialysis assembly via the feed/retentate chamber; and causing a concentration gradient across the ion exchange cationic membrane by means of passing a carrier fluid (e.g., water or an electrolyte solution) through the permeate chamber, wherein the monovalent cations permeate or diffuse across the ion exchange cationic membrane into the permeate chamber, thereby forming a monovalent ion-enriched stream in the permeate chamber and a monovalent ion-depleted nuclear waste stream in the feed/retentate chamber.

The present invention may also include a hybrid method for separating monovalent ions from a sodium-bearing radioactive waste stream which comprises: passing the sodium-bearing radioactive waste stream through at least one diffusion dialysis assembly which comprises at least one ion exchange cationic membrane having permselectivity for monovalent ions, a permeate chamber and a feed/retentate chamber, the permeate chamber and feed/retentate chamber being formed on opposite sides of the ion exchange cationic membrane, the sodium-bearing radioactive waste stream enters the diffusion dialysis assembly via the feed/retentate chamber; causing a concentration gradient across the ion exchange cationic membrane by means of passing a carrier fluid through the permeate chamber, wherein the monovalent cations permeate or diffuse across the ion exchange cationic membrane into the permeate chamber, thereby forming a monovalent ion-enriched stream in the permeate chamber and a monovalent ion-depleted nuclear waste stream in the feed/retentate chamber; passing the monovalent ion-enriched stream through at least one electrodialysis assembly which comprises an anode, a cathode, a means for supplying power to the anode and cathode, at least one ion exchange cationic membrane having permselectivity for monovalent ions, at least one ion exchange anionic membrane, a permeate chamber and a feed/retentate chamber alternatingly formed between adjacent pairs of the ion exchange cationic and anionic membranes, the monovalent ion-enriched stream enters the electrodialysis assembly via the feed/retentate chamber; and applying an electrical potential across the anode and cathode which causes the monovalent cations to permeate or diffuse across the ion exchange cationic membrane into the permeate chamber and the anions to permeate or diffuse across the ion exchange anionic membrane into the permeate chamber, thereby forming a concentrated monovalent ion-enriched stream in the permeate chamber and a dilute monovalent ion stream in the feed/retentate chamber. This process may further comprise the step of recycling the dilute monovalent ion stream to the diffusion dialysis assembly.

The present invention may also include any of the previous process schemes in combination with a cation exchange resin packed column; whereby the monovalent cation-enriched solution is passed over the resin which removes and later concentrates the radioactive cation such as lithium or cesium.

Other and further objects, advantages and features of the present invention will be understood by reference to the following specification in conjunction with the annexed drawings, wherein like pans have been given like numbers.

DESCRIPTION OF THE PREFERRED EMBODIMENTS

The present invention involves the removal of monovalent cations from sodium-bearing nuclear waste by ion exchange membrane separation having preferential permselectivity for monovalent ions. The selective ion exchange membrane separation can be either electric potential driven (e.g., electrodialysis) and/or chemical potential driven (e.g., diffusion dialysis) in which monovalent cations permeate through ion exchange membranes which would normally have rejected multivalent ions, but which have been chemically modified to have preferential permselectivity for monovalent ions.

Electrodialysis is an electrically driven ion exchange membrane separation technology that is capable of separating, concentrating and purifying selected ions from aqueous mixtures. The ion exchange membrane, the current density and the electrolyte to be processed all impact the performance of the elctrodialystic system.

The electrodialysis stack consists of both anion and cation exchange membranes assembled in an alternating fashion. Separated by gasket spacers which direct the flow of solution into the proper chambers (i.e., feed/retentate chambers and permeate chambers) and promotes flow distribution. The driving force in electrodialysis is electricity being applied as a direct current flowing from an anode located at one end of the alternating stack of anion and cation exchange membranes, through the stack to the cathode located at the other end of the stack.

Figure 1:
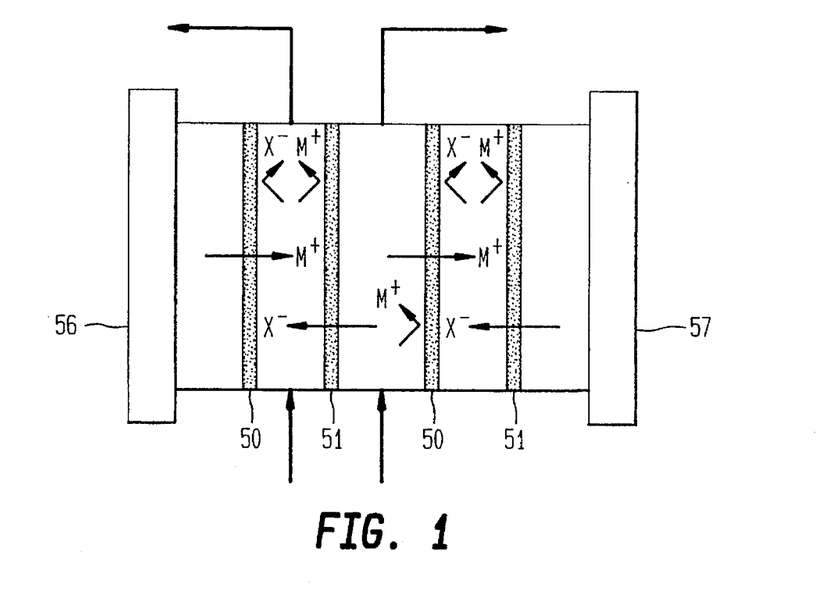
FIG. 1 is a schematic process diagram for using ion exchange membranes having preferential permselectivity for monovalent ions, in electrodialysis stack formation for electrolyte concentration.

An electrolyte solution or water (i.e., carrier fluid) is fed into the permeate chambers of the electrodialysis stack assembly as shown in FIG. 1. The direct current causes the cation and the anions to migrate respectively toward the cathodes and anodes. Upon contacting an ion exchange membrane surface, the membrane properties determine whether the ion is rejected or allowed to pass through the membrane.

Similar to ion exchange resin, the ion exchange membranes are polymeric, thin film containing electrically charged functional sites. The ion exchange membrane has two important properties: firstly, the membrane must be capable of selectively rejecting a permeate via certain ions on it called permselectivity; and secondly, the membrane must be one which is capable of enabling the product stream to have higher concentration than the feed stream (i.e., concentration transport).

Diffusion dialysis is a simple ion exchange membrane process that separates ionic, non-ionic, or colloidal species from an aqueous acid base or salt solution based on differences in the diffusion rates using the concentration differences across the membrane as the driving force. Since no outside energy is required, the equipment is simple to operate.

Figure 2:
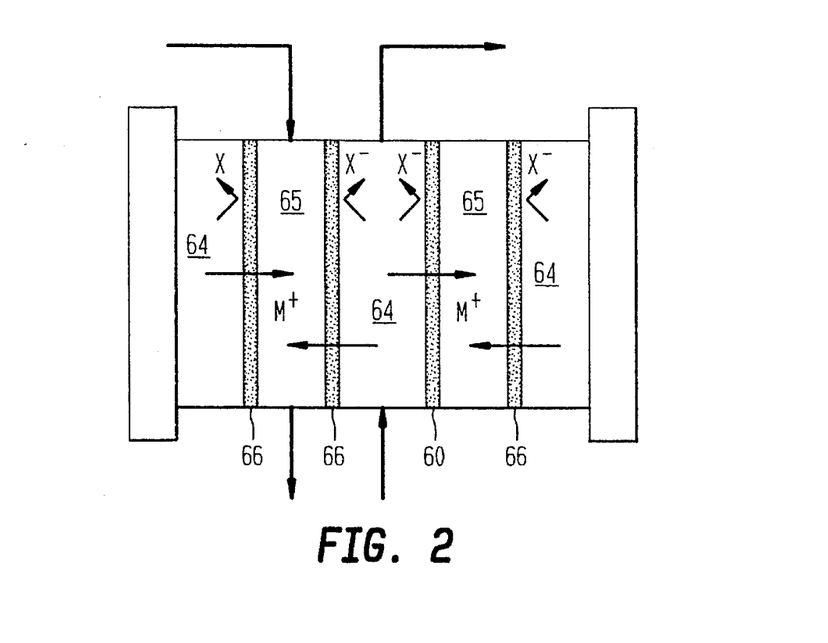
FIG. 2 is a schematic process diagram for using ion exchange membranes having preferential permselectivity for monovalent ions, in diffusion dialysis stack formation for removal of cations from electrolyte solution.

A diffusion dialysis stack assembly as shown in FIG. 2 is a repeating sandwich arrangement of permselective diffusion membranes (either cationic or anionic and spacer-gaskets). The spacer-gasket directs the solution flows via feed/retentate and permeate chambers and enhances the flow distribution and the turbulence in those chambers. Typically, it is the free acid or base that diffuses across the membrane into the product compartment which is fed by the water leaving behind the metals.

Ion exchange cationic membranes may be modified to exhibit permselectivity toward monovalent ions according to the present invention by treating the membrane with aqueous solution of cationic polyelectrolyte. The cationic polyelectrolyte layer being formed on the membrane surface. The formation of the cationic polyelectrolyte layer endows the membrane with specific permselectivity useful in electrodialysis. Still others have prepared ion exchange cationic membranes having permselectivity toward monovalent ions by chemically bonding polyelectrolyte layers to ion exchange membrane surfaces. These membrane have demonstrated long term chemical stability, eliminating the need for maintaining the membrane by periodical treatment with polyelectrolyte solution.

In particular, monovalent cation permselective membranes which are useful in separating monovalent ions sodium-bearing nuclear waste are preferably prepared from cation exchange polymeric membranes. These membranes comprise a polymeric backbone which can be formed from copolymers of styrene and vinyl benzene or fluorine polymers such as polytetrafluoroethylene (PTFE). On one side of the polymeric backbone their are anionic groups, i.e., sulfonic groups. Due to their particular geometry, these membranes can act as separation barriers in various applications such as electrodialysis, electrolysis and as battery separators. It has been found that coating of these ion exchange membranes with thin layers of polyelectrolyte will render them monovalent cation permselective. The polyelectrolyte layers typically possess cationic groups such as pydridinium or ammonium. The polyelectrolyte layer can be coated on the surface of the ion exchange membrane by means of coating or plasma deposition such that a chemical bond is formed between the ion exchange membrane surface and the thin polyelectrolyte layer.

Figure 5:
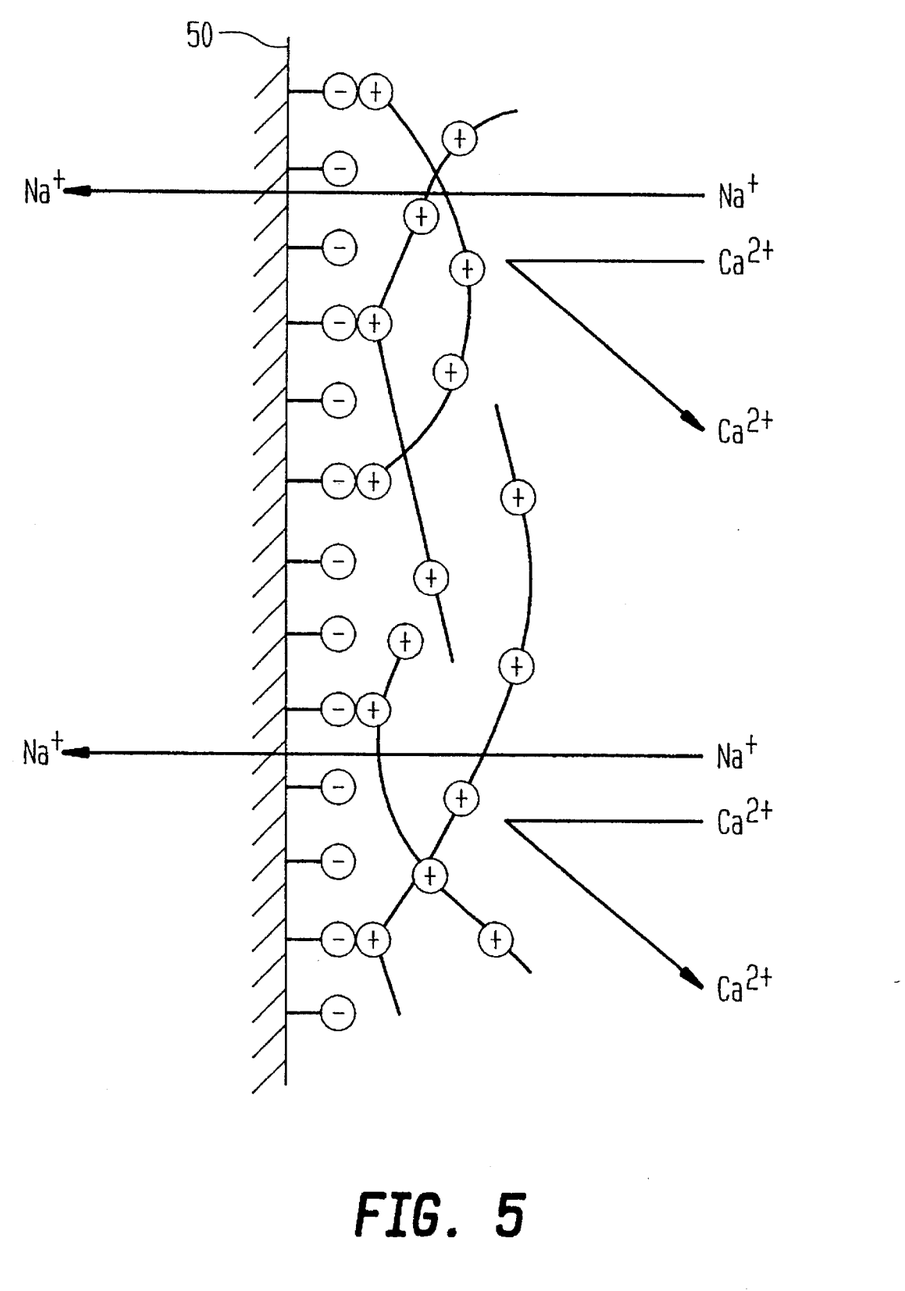
FIG. 5 depicts a mechanism of preferential permselectivity for monovalent cations through a modified cation exchange membrane.

FIG. 5 demonstrates the mechanism of rejection of multivalent cations and permeation of monovalent cations by the ion exchange membranes having preferential permselectivity for monovalent ions according to the present invention. As such, it is desirable according to the present invention to ensure that the permselective ion exchange membrane used in the treatment of sodium-bearing nuclear waste is one which is capable of permeating therethrough monovalent cations and retaining multivalent cations.

The preferential permselectivity of monovalent ions in electrodialysis of a mixed solution containing monovalent and multivalent ions can be calculated as follows. The relative transport number $P(M_2 \cdot M_1)$, which is a measure of the preferential permselectivity for monovalent ions, is defined as follows:

$$P(M_2 \cdot M_1) = (T_{M2}/T_{M1})/(C_{M2}/C_{M1})$$

where $t_{M1}$ is the transport number of the monovalent ion ($M_1$) through the membrane; $t_{M2}$ is the transport number of the divalent ion ($M_2$) through the membrane: $C_{M1}$ is the initial concentration of $M_1$ in the mixed solution; and $C_{M2}$ is the initial concentration of $M_2$ in the mixed solution.

In the case of cation exchange membranes, the relative transport number is also defined as follows:

$$P(M_2 \cdot M_1) = (C_{M2}/C_{M1})_b / (C_{M2}/C_{M1})_s$$

where the subscripts "b" and "s" indicate the equivalent concentration ratios of $M_2$ and $M_1$ in the concentration brine and in the feed solution, respectively.

Furthermore, the preferential permselectivity for monovalent cations ($B(Na^+ \text{and } K^+)$) can be shown by the content of monovalent cations, i.e., sodium and potassium in the total cations contained in the concentrated brine as follows:

$$B(Na^+ + K^+) = [(C_{NO3-} - C_{M2})/C_{NO3-}] \times 100$$

where $C_{NO3-}$ is nitrate equivalent concentration (which is approximately) equal to the concentration of total cations) in concentrated brine; $C_{M2}$ is the equivalent concentration of multivalent cations in concentrated brine. Here the sulfate concentration in the concentrated brine is assume to be negligible.

Ion exchange cationic membranes useful in the treatment system according to the present invention are describe in an article by T. Sata and R. Izuo, "Modification of Transport Properties of Ion Exchange Membranes", *Die Angewandte Makromolecular Chemie,* Vol. 171, pp. 101–17 (1989). This article, which is incorporated herein by reference, describes the preparation of permanent permselective cation exchange membranes by forming a polyethyleneimine layer on the membrane surface by acid-amide bond between polyethyleneimine and the —$SO_2Cl$ groups of a styrene divinylbenzene copolymer membrane after the reaction of the $SO_2Cl$. These membranes have demonstrated high selectivity toward sodium and potassium ions under electrodialysis conditions.

In an article by K. Yasuda et al., "Enhancement of Monovalent Cation Perm-Selectivity of Nafion by Plasma Induced Surface Modification", *Chemistry Letters,* pp. 2013–16 (1992), which is incorporated herein by reference, monovalent cation permselective membranes were prepared by the surface modification of perfluorosulfonate cation exchange membranes (e.g., Nafion®). Nafion® was spattered with oxygen plasma in order to produce radical sites on its surface. Ultra thin cationic layers were produced on the Nafion® surface by reaction between the radical sites and 4-vinylpyridine vapor. The resultant membrane showed high monovalent cation permselectivity and low membrane assistance.

In an article by Y. Mitutani, "Ion Exchange Membrane with Preferential Permselectivity for Monovalent Ions", *Journal of Membrane Science,* Vol. 54, pp. 233–57 (1990), which is incorporated herein by reference, ion exchange membranes with preferential selectivity were prepared by covering the membrane with a thin layer of polycation.

Particularly desirable ion exchange membranes having permselectivity for monovalent ions are Neosepta® ion exchange membranes sold by Tokuyama Soda Co., Ltd. and disclosed in U.S. Pat. Nos. 3,451,951, 3,901,774, 4,587,274, 3,510,418, 4,166,014, 4,680,355, 3,647,086, 4,090,931, 3,510,417, 4,101,395, 3,784,457, 4,169,023, 3,871,127, 4,190,514, 3,847,772, 4,190,516, 3,868,314, and 4,465,579, all of which are incorporated herein by reference.

It should be noted that all of the above-described ion exchange membranes having permselectivity for monovalent ions have primarily been used to concentrate or desalinate sea water to obtain either drinking water or raw salt for the soda industry or for making table salt. None of the current literature describes or suggests the use of these ion exchange membranes having permselectivity for monovalent ions for use in treating sodium-bearing nuclear waste as described in the present invention.

Figure 3:
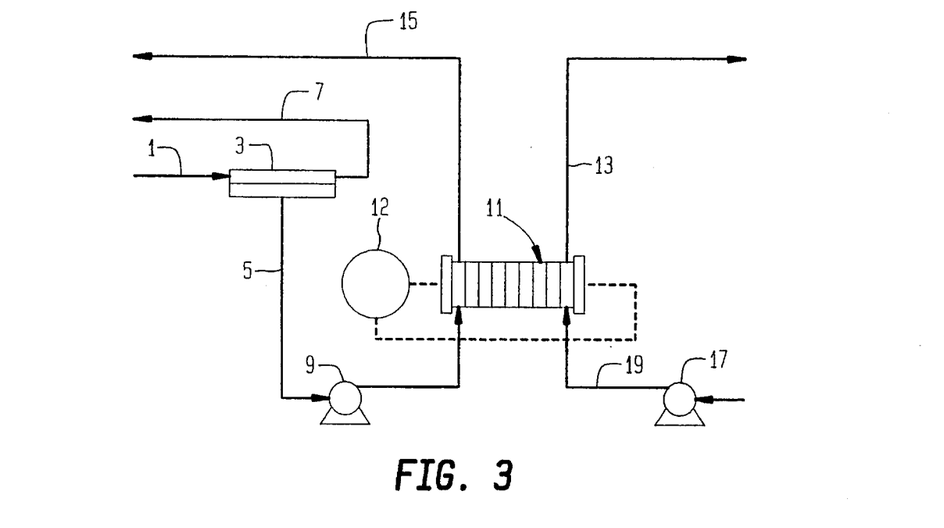
FIG. 3 is a schematic process diagram for using ion exchange membranes having preferential permselectivity for monovalent ions in an electrodialysis system for removal of monovalent ions from sodium-bearing nuclear waste solutions.
Figure 6:
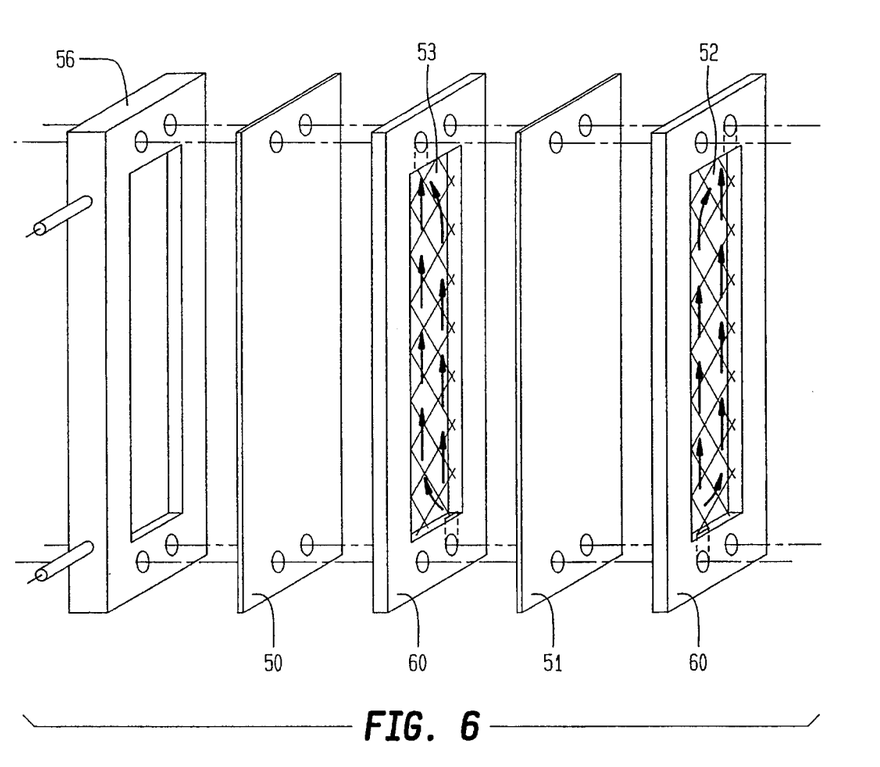
FIG. 6 is a schematic representation of an electrodialysis stack assembly which can be used in accordance with the present invention.

FIG. 3 is a schematic process for use of the monovalent permselective cation exchange membranes discussed above for sodium-bearing radioactive waste processing, wherein the resultant nuclear retentate will be approximately 90% or more sodium-free, thereby allowing the retentate to be calcined to minimize its volume and to enable long term storage. According to FIG. 3, sodium-bearing waste or solution from conduit 1 passes through a cross flow prefilter 3 to remove coarse solids. The clarified aqueous solution is taken via conduit 5, while the coarse solids are taken via conduit 7 for disposal. The clarified aqueous solution passes through conduit 5 to pump 9 where it is pumped through an electrodialysis membrane stack assembly 11. The electrodialysis membrane stack assembly 11 consists of both anion exchange membranes 51 and cation exchange membranes 50 assembled in alternating fashion as shown in FIG. 1. The anion and cation exchange membranes (51, 50) are separated by means of spacer gaskets 60, as shown in FIG. 6 attached hereto, to form alternating feed/retentate chambers 52 and permeate chambers 53 therebetween. An electric potential is supplied between membranes (50, 51) via power supply 12. The sodium and/or potassium ions pass from feed/retentate chambers 52 through cation membranes 50 which have been modified to permit permeation of monovalent ions only into permeate chambers 53, while prohibiting the diffusion or permeation of multivalent ions, anions and o other nondesirable metals disposed in electrodialysis membrane stack assembly 11 into permeate chambers 53, such that a monovalent-enriched stream is formed in permeate chambers 53. It is preferable that water, salt or other desirable monovalent ion carrier solutions be continuously passed through permeate chambers 53 in order to carry away the monovalent ions which have diffused or permeated across ion exchange membranes 50 into permeate chambers 53. The deionized water, salt or other monovalent ion carrier liquid is supplied to electrodialysis membrane stack assembly 11 via pump 17 and conduit 19. This monovalent-enriched stream is then collected as permeate via conduit 13. The remainder of the nuclear waste solutes having preferably approximately 90% or more of the sodium ions depleted therefrom (i.e., a monovalent-depleted stream) does not pass or diffuse across ion exchange membranes 50 and is removed from electrodialysis membrane stack assembly 11 as retentate via conduit 15 for downstream vitrification or calcination and eventual nuclear waste storage.

By having cation and anion membranes (50, 51) alternatingly disposed between one another, together with a power source 12, all of the monovalent cations disposed in feed/retentate chambers 53 move from anode 56 towards cathode 57 and diffuse through their respective cation exchange membranes 50 but get trapped in the monovalent-enriched stream permeate chamber 53 since they cannot pass through the next adjacent anion exchange membrane 51. Conversely, anions disposed in feed/retentate chamber 52 move from cathode 57 towards anode 56, pass through their respective anion exchange membrane 51 but also get trapped in the monovalent-enriched stream chamber 53 since they cannot pass through the next adjacent cation exchange membrane 50.

Membrane system pump 9 provides the required cross flow velocity through electrodialysis membrane stack assembly 11. While FIG. 3 depicts a simple once through process design, it is envisioned that most commercial designs would utilize multiple, circulated stages-in-series design or a recirculation design providing for greater separation of monovalent ion-enriched stream from the monovalent-poor stream.

The process shown in FIG. 3 produces two product streams. The first product stream is a permeate stream (i.e., monovalent-enriched stream) which will contain a high concentration of monovalent cations (e.g., sodium, potassium, lithium, cesium, etc.). The permeate stream will contain these alkali metals in base form with hydroxide as a counter ion. However, the system can be tailored to extract nitrate ions as well by using permselective anion exchange membranes.

The second product stream is a retentate stream (i.e., a monovalentdepleted radioactive stream) which will contain the radioactive waste, multivalent ions, heavy metals and toxic metals. This solution is either pumped back to the feed/retentate chambers 5 2 if the process is run in a recirculation mode, or to another storage tank if the process is run in a continuous mode.

Alternatively, the retentate could be further processed by additional electrodialysis membrane stacks connected in series. The reduced content of monovalent cations will render the retentate or monovalent-depleted stream feasible for further minimization processes and eventual vitrification or calcination.

Figure 4:
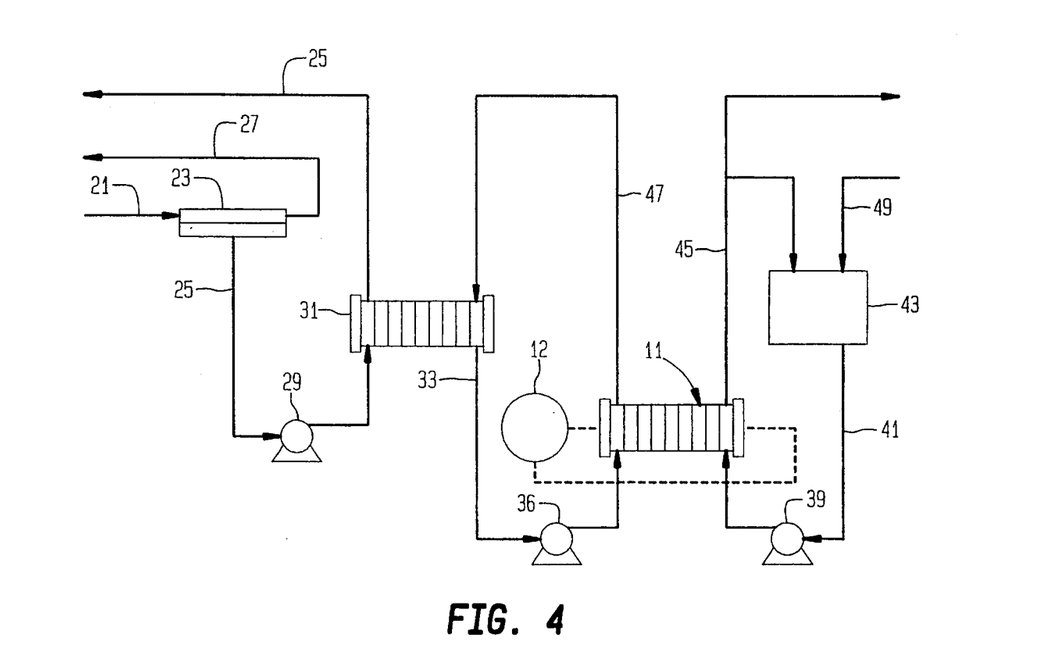
FIG. 4 is a schematic process diagram for using ion exchange membranes having preferential permselectivity for monovalent ions in a hybrid system having electrodialysis and diffusion dialysis for removal of monovalent ions from sodium-bearing nuclear waste.

Production of a monovalent ion-depleted stream can also be had by means of diffusion dialysis as shown in FIG. 4. Under diffusion dialysis processing the sodium-bearing waste is passed via conduit 21 through a cross flow prefilter 23 to remove coarse solids. The clarified aqueous solution is taken via conduit 25, while the coarse solids are taken via conduit 27 for disposal. The clarified aqueous solution passes through conduit 25 to pump 29 where it is pumped through a diffusion dialysis membrane stack assembly 31. The diffusion dialysis membrane stack assembly 31, unlike the electrodialysis membrane stack assembly 11 discussed above in FIG. 3, includes a series of adjacent monovalent-selective, cation exchange membranes 66 separated by spacer gaskets to for alternating feed/retentate chambers 64 and permeate chambers 65. The clarified aqueous solution passes through feed/retentate chamber 64 while monovalent ions diffuse or permeate across adjacent cation exchange membranes which form the feed/retentate chambers 64 and pass into adjacent permeate chambers 65, while the anions and other radioactive nuclear waste solutions are retained within feed/retentate chamber 64. In order to create the concentration gradient required to permit diffusion of the monovalent cations across the respective cation exchange membranes a carrier stream such as water must be continuously passed through permeate chambers 65. This carrier stream may diffuse back and forth across monovalent-selective, cation exchange membranes 66 during the separation of the monovalent ions from the sodium-bearing nuclear water. The retentate comprising primarily anions, multivalent cations, heavy metals and toxic metals pass out of diffusion dialysis membrane stack assembly 31 as a monovalent-poor stream via conduit 25 for downstream vitrification or calcination and eventual nuclear waste storage. The monovalent cations which pass through monovalent-selective, cationic exchange membranes 66 into permeate chambers 65 are mixed with the carrier stream to form a monovalent-enriched stream which is removed from diffusion dialysis stack assembly 31 via conduit 33.

Alternatively, a hybrid system comprising a diffusion dialysis membrane stack assembly 31 and an electrodialysis membrane stack assembly 11 (as shown in FIG. 4) can be formed to further concentrate the monovalent cations. In accordance with this hybrid system, the monovalent-enriched stream removed from diffusion dialysis membrane stack assembly 31 via conduit 33 is pumped via pump 5 to an electrodialysis membrane stack 11. Electrodialysis membrane stack assembly 11 is preferably similar to the electrodialysis separation device described above in FIG. 3 above and consists of both anion and cation exchange membranes assembled in alternating fashion to form respective feed/retentate chambers 52 and permeate chambers 53. The anion and cation exchange membranes are disposed between electric potential supplied via power supply 12. The monovalent cations and monovalent anions pass through cation and anion membranes (50, 51) disposed in electrodialysis membrane stack assembly 11 such that they form a concentrated monovalent-enriched stream in the permeate chambers together with a carried stream or fluid such as deionized water or an electrolyte solution supplied via pump 39, conduit 41 and concentrate recycle tank 43. This concentrated monovalent-enriched stream is then collected as permeate via conduit 45. The depleted monovalent-enriched stream (i.e., a depleted monovalent solution) is removed from the respective feed/retentate chambers 52 via conduit 47 and recycled to diffusion dialysis membrane stack assembly 31 as the carrier stream or fluid. It is preferable that water be removed from the permeate stream as it passes through conduit 45. This water may be removed by any know method such as membrane separation, distillation, etc. The separated water is recycled to concentrate recycle tank 43 and, optionally, mixed with fresh deionized water from conduit 49 for later use as the carrier stream or fluid in the electrodialysis process. This acts to reduce the amount of waste water which exits the process. The concentrated monovalent-enriched stream should be dried to recover water as well as spent monovalent ions, or disposed of as a low level waste.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A process for separating monovalent ions from a sodium-bearing radioactive waste stream which comprises contacting said sodium-bearing radioactive waste stream against at least one ion exchange membrane having permselectivity for monovalent ions wherein said monovalent ions diffuse or permeate across said ion exchange membrane to form a permeate of a monovalent ion-enriched stream and wherein a retentate is formed from said sodium-bearing radioactive waste stream which is substantially depleted of monovalent ions.

2. The process according to claim 1 wherein said monovalent ions are at least one ion selected from the group consisting of: sodium, potassium, lithium, cesium, rubidium, and francium.

3. The process according to claim 2 wherein said monovalent ions include sodium.

4. The process according to claim 1 wherein said ion exchange membranes having permselectivity for monovalent ions is an ion exchange cationic membrane having a cationic polyelectrolyte layer formed thereon.

5. The process according to claim 4 wherein said ion exchange cationic membrane comprises a polymeric backbone which can be formed from copolymers of styrene and vinyl benzene or fluorine polymers.

6. The process according to claim 5 wherein said fluorine polymers are polymers and copolymers selected from the group consisting of: tetrafluoroethylene, vinylidenefluoride and vinylfluoride.

7. The process according to claim 5 wherein said polyelectrolyte layer is polyethyleneimine and said ion exchange cationic membrane is a styrene divinylbenzene copolymer membrane.

8. The process according to claim 7 wherein said polyethyleneimine bonded to said styrene divinylbenzene copolymer membrane by an acid-amide bond between polyethyleneimine and the —$SO_2Cl$ groups of said styrene divinylbenzene copolymer membrane after the reaction of the $SO_2Cl$.

9. The process according to claim 4 wherein said cationic polyelectrolyte layer comprises cationic groups such as pydridinium or ammonium.

10. The process according to claim 4 wherein said cationic polyelectrolyte layer is formed on the surface of said ion exchange cationic membrane by means of coating or plasma deposition such that a chemical bond is formed between said ion exchange cationic membrane surface and said cationic polyelectrolyte layer.

11. The process according to claim 8 wherein said ion exchange cationic membrane is a perfluorosulfonate cation exchange membrane and the polyelectrolyte cationic layer is formed by plasma deposition of a 4-vinylpyridine vapor between the radical sites on the perfluorosulfonate cation exchange membrane.

12. The process according to claim 1 wherein the separation occurs under dialysis.

13. The process according to claim 12 wherein said dialysis is either diffusion dialysis, electrodialysis or both.

14. The process according to claim 1 further comprising the step of passing said monovalent ion-enriched stream over a cation exchange resin, wherein cations selected from the group consisting of lithium and cesium are separated from said monovalent ion-enriched stream.

15. A method for separating monovalent ions from a sodium-bearing radioactive waste stream which comprises:
    passing said sodium-bearing radioactive waste stream through at least one electrodialysis assembly which comprises an anode, a cathode, a means for supplying power to said anode and cathode, at least one ion exchange cationic membrane having permselectivity for monovalent ions, at least one ion exchange anionic membrane, a permeate chamber and a feed/retentate chamber alternatingly formed between adjacent pairs of said ion exchange cationic and anionic membranes, said sodium-bearing radioactive waste stream enters said electrodialysis assembly via said feed/retentate chamber; and
    applying an electrical potential across said anode and cathode which causes said monovalent cations to permeate or diffuse across said ion exchange cationic membrane into said permeate chamber and said anions to permeate or diffuse across said ion exchange anionic membrane into said permeate chamber, thereby forming a monovalent ion-enriched stream in said permeate chamber and a monovalent ion-depleted nuclear waste stream in said feed/retentate chamber.

16. The process according to claim 15 wherein said ion exchange cationic membranes having permselectivity for monovalent ions is an ion exchange cationic membrane having a cationic polyelectrolyte layer formed thereon.

17. The process according to claim 15 further comprising the step of passing said monovalent ion-enriched stream over a cation exchange resin; whereby cations such as lithium and cesium are separated from said monovalent ion-enriched stream.

18. A method for separating monovalent ions from a sodium-bearing radioactive waste stream which comprises:
    passing said sodium-bearing radioactive waste stream through at least one diffusion dialysis assembly which comprises at least one ion exchange cationic membrane having permselectivity for monovalent ions, a permeate chamber and a feed/retentate chamber, said permeate chamber and feed/retentate chamber being formed on opposite sides of said ion exchange cationic membrane, said sodium-bearing radioactive waste stream enters said diffusion dialysis assembly via said feed/retentate chamber; and
    causing a concentration gradient across said ion exchange cationic membrane by means of passing a carrier fluid through said permeate chamber, wherein said monovalent cations permeate or diffuse across said ion exchange cationic membrane into said permeate chamber, thereby forming a monovalent ion-enriched stream in said permeate chamber and a monovalent ion-depleted nuclear waste stream in said feed/retentate chamber.

19. The process according to claim 18 wherein said ion exchange cationic membranes having permselectivity for monovalent ions is an ion exchange cationic membrane having a cationic polyelectrolyte layer formed thereon.

20. The process according to claim 18 further comprising the step of passing said monovalent ion-enriched stream over a cation exchange resin, wherein cations selected from the group consisting of lithium and cesium are separated from said monovalent ion-enriched stream.

21. A process for separating monovalent ions from a sodium-bearing radioactive waste stream which comprises:
    passing said sodium-bearing radioactive waste stream through at least one diffusion dialysis assembly which comprises at least one ion exchange cationic membrane having permselectivity for monovalent ions, a permeate chamber and a feed/retentate chamber, said permeate chamber and feed/retentate chamber being formed on opposite sides of said ion exchange cationic membrane, said sodium-bearing radioactive waste stream enters said diffusion dialysis assembly via said feed/retentate chamber;
    causing a concentration gradient across said ion exchange cationic membrane by means of passing a carrier fluid through said permeate chamber, wherein said monovalent cations permeate or diffuse across said ion exchange cationic membrane into said permeate chamber, thereby forming a monovalent ion-enriched stream in said permeate chamber and a monovalent ion-depleted nuclear waste stream in said feed/retentate chamber;
    passing said monovalent ion-enriched stream through at least one electrodialysis assembly which comprises an anode, a cathode, a means for supplying power to said anode and cathode, at least one ion exchange cationic membrane having permselectivity for monovalent ions, at least one ion exchange anionic membrane, a permeate chamber and a feed/retentate chamber alternatingly formed between adjacent pairs of said ion exchange cationic and anionic membranes, said monovalent ion-enriched stream enters said electrodialysis assembly via said feed/retentate chamber; and applying an electrical potential across said anode and cathode which causes said monovalent cations to permeate or diffuse across said ion exchange cationic membrane into said permeate chamber and said anions to permeate or diffuse across said ion exchange anionic membrane into said permeate chamber, thereby forming a concentrated monovalent ion-enriched stream in said permeate chamber and a dilute monovalent ion stream in said feed/retentate chamber.

22. The process according to claim 21 wherein said ion exchange cationic membranes having permselectivity for monovalent ions is an ion exchange cationic membrane having a cationic polyelectrolyte layer formed thereon.

23. The process according to claim 21 further comprising the step of passing said concentrated monovalent ion-enriched stream over a cation exchange resin; whereby cations such as lithium and cesium are separated from said monovalent ion-enriched stream.

24. A system for separating monovalent ions from a sodium-bearing radioactive waste stream which comprises:

at least one electrodialysis assembly which comprises an anode, a cathode, a means for supplying power to said anode and cathode, at least one ion exchange cationic membrane having permselectivity for monovalent ions, at least one ion exchange anionic membrane, a permeate chamber and a feed/retentate chamber alternatingly formed between adjacent pairs of said ion exchange cationic and anionic membranes;

a means for feeding said sodium-bearing radioactive waste stream into said feed/retentate chamber of said electrodialysis assembly;

means for applying an electrical potential across said anode and cathode which causes said monovalent cations to permeate or diffuse across said ion exchange cationic membrane into said permeate chamber and said anions to permeate or diffuse across said ion exchange anionic membrane into said permeate chamber, thereby forming a monovalent ion-enriched stream in said permeate chamber and a monovalent ion-depleted nuclear waste stream in said feed/retentate chamber.

25. A system for separating monovalent ions from a sodium-bearing radioactive waste stream which comprises:

at least one diffusion dialysis assembly which comprises at least one ion exchange cationic membrane having permselectivity for monovalent ions, a permeate chamber and a feed/retentate chamber, said permeate chamber and feed/retentate chamber being formed on opposite sides of said ion exchange cationic membrane;

means for feeding said sodium-bearing radioactive waste stream to said feed/retentate chamber of said diffusion dialysis assembly;

means for passing a carrier fluid through said permeate chamber in order to cause a concentration gradient across said ion exchange cationic membrane, wherein said monovalent cations permeate or diffuse across said ion exchange cationic membrane into said permeate chamber, thereby forming a monovalent ion-enriched stream in said permeate chamber and a monovalent ion-depleted nuclear waste stream in said feed/retentate chamber;

at least one electrodialysis assembly which comprises an anode, a cathode, a means for supplying power to said anode and cathode, at least one ion exchange cationic membrane having permselectivity for monovalent ions, at least one ion exchange anionic membrane, a permeate chamber and a feed/retentate chamber alternatingly formed between adjacent pairs of said ion exchange cationic and anionic membranes;

means for feeding said monovalent ion-enriched stream to said feed/retentate chamber of said electrodialysis assembly; and means for applying an electrical potential across said anode and cathode which causes said monovalent cations to permeate or diffuse across said ion exchange cationic membrane into said permeate chamber and said anions to permeate or diffuse across said ion exchange anionic membrane into said permeate chamber, thereby forming a concentrated monovalent ion-enriched stream in said permeate chamber and a dilute monovalent ion stream in said feed/retentate chamber.

* * * * *